United States Patent
Melakari et al.

(10) Patent No.: US 11,056,030 B1
(45) Date of Patent: Jul. 6, 2021

(54) DISPLAY APPARATUS AND METHOD OF ENHANCING APPARENT RESOLUTION USING LIQUID-CRYSTAL DEVICE

(71) Applicant: Varjo Technologies Oy, Helsinki (FI)

(72) Inventors: Klaus Melakari, Oulu (FI); Oiva Arvo Oskari Sahlsten, Salo (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/783,557

(22) Filed: Feb. 6, 2020

(51) Int. Cl.
| | |
|---|---|
| G09G 5/02 | (2006.01) |
| G09G 5/10 | (2006.01) |
| G09G 5/00 | (2006.01) |
| G09G 3/00 | (2006.01) |
| G06F 3/01 | (2006.01) |
| G09G 3/36 | (2006.01) |
| G02F 1/1333 | (2006.01) |
| G02F 1/1347 | (2006.01) |

(52) U.S. Cl.
CPC ........... G09G 3/007 (2013.01); G02F 1/1347 (2013.01); G02F 1/13338 (2013.01); G06F 3/013 (2013.01); G09G 3/36 (2013.01); G09G 2320/0261 (2013.01); G09G 2340/0407 (2013.01); G09G 2340/0457 (2013.01); G09G 2354/00 (2013.01)

(58) Field of Classification Search
CPC ....................................................... G06F 3/013
See application file for complete search history.

(56) References Cited

U.S. PATENT DOCUMENTS

| | | | |
|---|---|---|---|
| 6,456,340 B1* | 9/2002 | Margulis | G06T 1/20 345/501 |
| 9,710,887 B1 | 7/2017 | Sahlsten et al. | |
| 2002/0008812 A1* | 1/2002 | Conner | G02B 27/1086 349/106 |
| 2002/0021392 A1* | 2/2002 | Ohtake | G02F 1/133553 349/115 |

(Continued)

FOREIGN PATENT DOCUMENTS

WO 2013171168 A1 11/2013

OTHER PUBLICATIONS

International Search Report and Written Opinion of the International Searching Authority, Application No. PCT/FI2021/050082, dated Apr. 23, 2021, 19 pages.

(Continued)

*Primary Examiner* — Nan-Ying Yang
(74) *Attorney, Agent, or Firm* — Ziegler IP Law Group, LLC

(57) ABSTRACT

A display apparatus including an image renderer per eye; a liquid-crystal device including a liquid-crystal structure and a control circuit, the liquid-crystal structure being arranged in front of image-rendering surface of image renderer, wherein liquid-crystal structure is to be electrically controlled, via control circuit, to shift light emanating from a given pixel of the image renderer to a plurality of positions in a sequential and repeated manner; and at least one processor configured to render a sequence of output image frames via the image renderer, wherein a shift in the light emanating from the given pixel of the image renderer to the plurality of positions causes a resolution of the output image frames to appear higher than a display resolution of the image renderer.

14 Claims, 4 Drawing Sheets

(56) References Cited

U.S. PATENT DOCUMENTS

| | | |
|---|---|---|
| 2017/0270637 A1 | 9/2017 | Perreault et al. |
| 2018/0136471 A1* | 5/2018 | Miller ................ G02B 27/0189 |
| 2019/0243134 A1 | 8/2019 | Perreault et al. |
| 2019/0318677 A1 | 10/2019 | Lu et al. |

OTHER PUBLICATIONS

Notification of Transmittal of The International Search Report and The Written Opinion of The International Searching Authority, or The Declaration, Application No. PCT/FI2021/050073, dated Apr. 30, 2021, 17 pages.

* cited by examiner $\theta = 90°$

DISPLAY APPARATUS AND METHOD OF ENHANCING APPARENT RESOLUTION USING LIQUID-CRYSTAL DEVICE

TECHNICAL FIELD

The present disclosure relates generally to display apparatuses for presenting extended-reality environments; and more specifically, to display apparatuses comprising image renderers, liquid-crystal devices, and processors. Moreover, the present disclosure also relates to methods of displaying via the aforementioned display apparatuses.

BACKGROUND

Presently, several technologies (for example, such as virtual reality (VR), augmented reality (AR), mixed reality (MR) and the like) are being used to present interactive extended-reality environments to users. Typically, the users utilize specialized devices (for example, such as a virtual reality device, an augmented reality device, a mixed reality device, and the like) for experiencing and interacting with such extended-reality environments. In use, the user generally wears (namely, supports) the specialized device on his/her head.

Conventional specialized devices employ various equipment in order to generate and render images that constitute the extended-reality environment. Generally, the specialized devices render different offset views of the images that constitute the extended-reality environment, via different image renderers associated with different eyes of the user. Various image renderers having various display resolutions are being used in conventional specialized devices. Typically, image renderers having high display resolutions are extremely expensive. Therefore, nowadays, the specialized devices are being improved to provide the high resolutions for the images using image renderers having moderate display resolutions. As an example, the specialized devices are being used to provide apparent spatio-temporal super resolutions (namely, spatial resolutions approximating super-resolution and temporal resolutions approximating extremely high frame rates) for the images. Commonly used techniques for providing the apparent spatio-temporal super resolutions include moving the image renderers in a two-dimensional plane using actuators, using a movable lenticular array on top of the image renderers, and the like.

However, provision of high resolutions for the images in the aforesaid manner has several difficulties associated therewith. As an example, the commonly used techniques for providing the spatio-temporal super resolutions are sub-optimal on many counts. Firstly, said techniques lower refresh rate of the image renderers to achieve super-resolution spatial resolution, thereby, introducing perceivable flicker in the rendered images. When the user perceives this flicker, his/her experience of the extended-reality environments is considerably degraded. Secondly, physical movement of components within the specialized devices causes audible sound, since a required moving frequency is in a human audible range (of approximately 50-200 Hertz). Thirdly, in order to provide sufficient space for the physical movement of components, the conventional specialized devices are designed to be large in size. Moreover, an arrangement of components within the specialized devices becomes very complex due to use of movable components. Inertia and vibration of the movable components also pose design constraints on the conventional specialized devices. Furthermore, the conventional specialized devices are extremely fragile due to use of the movable components.

Therefore, in light of the foregoing discussion, there exists a need to overcome the aforementioned drawbacks associated with provision of high-resolution images in specialized devices.

SUMMARY

The present disclosure seeks to provide a display apparatus. The present disclosure also seeks to provide a method of displaying, via a display apparatus. The present disclosure seeks to provide a solution to the existing problem of limited resolution of images in conventional specialized devices. An aim of the present disclosure is to provide a solution that overcomes at least partially the problems encountered in prior art, and provides a display apparatus that provides an enhanced apparent resolution of images.

In one aspect, an embodiment of the present disclosure provides a display apparatus comprising:
an image renderer per eye;
a liquid-crystal device comprising a liquid-crystal structure and a control circuit, wherein the liquid-crystal structure is arranged in front of an image-rendering surface of the image renderer, wherein the liquid-crystal structure is to be electrically controlled, via the control circuit, to shift light emanating from a given pixel of the image renderer to a plurality of positions in a sequential and repeated manner; and
at least one processor configured to render a sequence of output image frames via the image renderer, wherein a shift in the light emanating from the given pixel of the image renderer to the plurality of positions causes a resolution of the output image frames to appear higher than a display resolution of the image renderer.

In another aspect, an embodiment of the present disclosure provides a method of displaying via a display apparatus, the display apparatus comprising an image renderer per eye and a liquid-crystal device comprising a liquid-crystal structure and a control circuit, wherein the liquid-crystal structure is arranged in front of an image-rendering surface of the image renderer, the method comprising:
 rendering a sequence of output image frames via the image renderer; and
 electrically controlling, via the control circuit, the liquid-crystal structure to shift light emanating from a given pixel of the image renderer to a plurality of positions in a sequential and repeated manner, wherein a shift in the light emanating from the given pixel of the image renderer to the plurality of positions causes a resolution of the output image frames to appear higher than a display resolution of the image renderer.

Embodiments of the present disclosure substantially eliminate or at least partially address the aforementioned problems in the prior art, and enable resolution enhancement in a manner that apparent resolution of images is higher than display resolution of image renderers of the display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
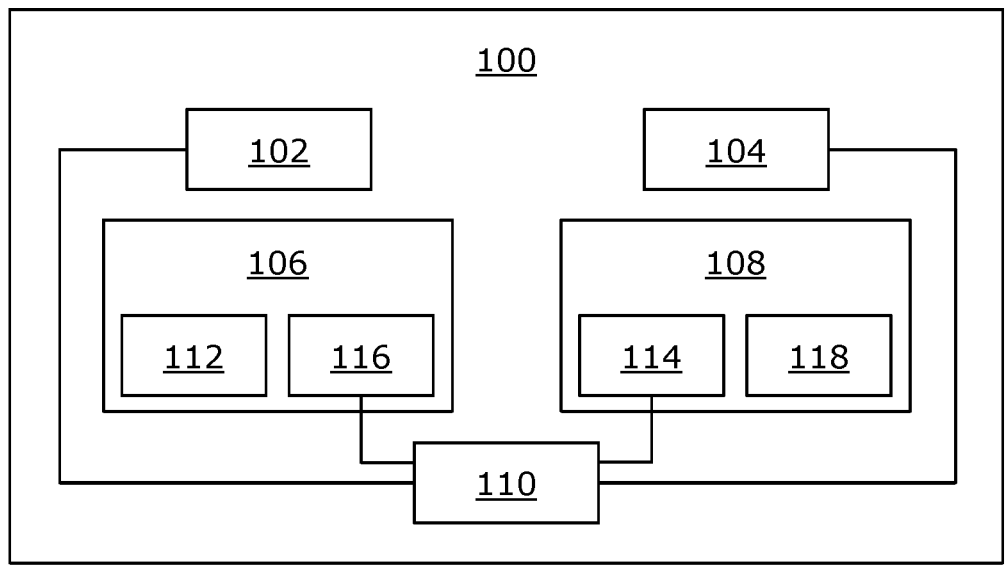
FIGS. 1 and 2 illustrate block diagrams of architectures of a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:
an image renderer per eye;
a liquid-crystal device comprising a liquid-crystal structure and a control circuit, wherein the liquid-crystal structure is arranged in front of an image-rendering surface of the image renderer, wherein the liquid-crystal structure is to be electrically controlled, via the control circuit, to shift light emanating from a given pixel of the image renderer to a plurality of positions in a sequential and repeated manner;
and at least one processor configured to render a sequence of output image frames via the image renderer, wherein a shift in the light emanating from the given pixel of the image renderer to the plurality of positions causes a resolution of the output image frames to appear higher than a display resolution of the image renderer.

In another aspect, an embodiment of the present disclosure provides a method of displaying via a display apparatus, the display apparatus comprising an image renderer per eye and a liquid-crystal device comprising a liquid-crystal structure and a control circuit, wherein the liquid-crystal structure is arranged in front of an image-rendering surface of the image renderer, the method comprising:
rendering a sequence of output image frames via the image renderer; and
electrically controlling, via the control circuit, the liquid-crystal structure to shift light emanating from a given pixel of the image renderer to a plurality of positions in a sequential and repeated manner, wherein a shift in the light emanating from the given pixel of the image renderer to the plurality of positions causes a resolution of the output image frames to appear higher than a display resolution of the image renderer.

The present disclosure provides the aforementioned display apparatus and the aforementioned method. The apparent resolution of the output image frames (that are visible to the user) is enhanced by shifting light emanating from pixels of the image renderer to the plurality of positions in a sequential and repeated manner. As a result, the resolution of the output image frames appears to be higher than the display resolution of the image renderer. The user's experience of using the display apparatus is excellent as the user perceives high visual detail within extended-reality environments presented via the display apparatus. Moreover, the display apparatus provides the aforesaid enhanced resolution without requiring physically movable components. This eliminates production of audible sounds of component movement, which are generally known to diminish the user's viewing experience. Moreover, as physically movable components are not used, the display apparatus can be designed to be more compact and to have a simplified arrangement of components as compared to conventional specialized devices. The display apparatus is free from the design constraints posed by inertia and vibration of the movable components. Furthermore, the display apparatus is robust since it does not include the movable components.

Throughout the present disclosure, the term "display apparatus" refers to a specialized equipment that is configured to present an extended-reality environment to a user when the display apparatus in operation is worn by the user on his/her head. In such an instance, the display apparatus acts as a display device (for example, such as an extended-reality headset, a pair of extended-reality glasses, and the like) that is operable to present a visual scene of the extended-reality environment to the user. Commonly, the term "display apparatus" is referred to as "head-mounted display apparatus", for the sake of convenience only.

Throughout the present disclosure, the term "extended-reality" encompasses virtual reality, augmented reality, mixed reality, and the like.

In some implementations, the display apparatus could be implemented as a head-mounted display device. In other implementations, the display apparatus could be implemented as a head-mounted display device and a computer on which image processing operations are performed. The computer can be understood to be an external computing device that is physically external to the display apparatus. The computer is communicably coupled to the at least one processor of the display apparatus wirelessly and/or in a wired manner. It will be appreciated that performing, at the computer, at least some computational tasks associated with image processing is beneficial, as it would reduce processing burden on the at least one processor of the display apparatus.

Throughout the present disclosure, the term "image renderer" refers to equipment that, in operation, renders images that are to be shown to the user of the display apparatus. In particular, for rendering a given image, the image renderer renders output image frames of the given image. The "image rendering surface" of the image renderer refers to a surface of the image renderer from which light of the rendered images emanates. In other words, projections of the rendered output image frames emanate from the image rendering surface of the image renderer.

In an embodiment, the image renderer is implemented as a display. Optionally, the display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display. Optionally, the display has a multi-layered structure. In this regard, the multi-layered structure comprises layers such as, but not limited to, color filters, encapsulation glass, backplanes built on substrates (for example, such as glass, polyimide, and so forth), protection films, optical diffusers, and top and/or bottom polarizers. Optionally, the image rendering surface of the display is an outermost front layer (namely, a front surface) of the multi-layered structure from which the projections of the output image frames emanate.

In another embodiment, the image renderer is implemented as a projector. In this regard, the sequence of output image frames is projected onto a projection screen or directly onto retinas of the user's eyes. The sequence of output image frames could be projected onto the projection screen from either a back side of the projection screen or from a front side of the projection screen. Optionally, the projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector. Optionally, the image rendering surface of the projector is a front surface of the projection screen or a surface within the projector (for the direct retinal projection case).

The display apparatus comprises one image renderer per eye of the user. Specifically, a first image renderer of the display apparatus renders first images to be shown to a first eye of the user, whereas a second image renderer of the display apparatus renders second images to be shown to a second eye of the user, the first and second images being offset with respect to each other. These offset first and second images, when viewed by the user, provide a perception of three-dimensional depth in the visual scene.

It will be appreciated that the image renderer is associated with a specific display resolution. Herein, the "display resolution" of the image renderer refers to a total number of pixels in each dimension of the image renderer, or to a pixel density (namely, a number of pixels per unit distance or area) in the image renderer. The image renderer generally comprises a plurality of pixels, wherein the plurality of pixels are arranged in a required manner (for example, such as a rectangular two-dimensional grid). A given pixel of the image renderer comprises a plurality of sub-pixels. A given sub-pixel is a separately addressable single-color picture element. The plurality of sub-pixels of the given pixel are arranged in a required form (for example, such as a one-dimensional array, a two-dimensional grid, a PenTile® matrix layout, and the like). Optionally, the given pixel comprises 3 sub-pixels. As an example, the given pixel may comprise a red sub-pixel, a green sub-pixel, and a blue sub-pixel. Four such exemplary pixels have been illustrated in conjunction with FIG. 5A, as described below. As another example, the given pixel may comprise a cyan sub-pixel, a magenta sub-pixel, and a yellow sub-pixel. Alternatively, optionally, the given pixel comprises 5 sub-pixels. Optionally, in this regard, the 5 sub-pixels comprise two red sub-pixels, two green sub-pixels, and one blue sub-pixel that are arranged in the PenTile® matrix layout. Optionally, the given pixel may comprise a reduced set of sub-pixels. As an example, instead of an entire set of red, green, and blue sub-pixels, the given pixel may comprise a reduced set of only red and green sub-pixels.

Throughout the present disclosure, the term "liquid-crystal device" refers to a device that enables shifting of light passing therethrough using a liquid-crystal medium. The liquid-crystal device can be understood to steer the light passing therethrough. The liquid-crystal structure contains the liquid-crystal medium. The control circuit is a specialized circuit that electrically controls the liquid-crystal medium contained within the liquid-crystal structure. The liquid-crystal structure is arranged in front of the image-rendering surface of the image renderer. In operation, the control circuit applies electrical signals to control the liquid-crystal medium contained within the liquid-crystal structure in a required manner, so as to shift light emanating from a given pixel of the image renderer to the plurality of positions in the sequential and repeated manner. Optionally, the electrical signals applied by the control circuit control an orientation of liquid-crystal molecules of the liquid-crystal medium. Notably, the light emanating from the given pixel is shifted in a fixed order.

It will be appreciated that the liquid-crystal device is optimized according to the image renderer. For optimum functioning of the display apparatus, the liquid-crystal device is designed according to the display resolution of the image renderer.

Optionally, the light emanating from the given pixel of the image renderer is shifted by a fraction of the given pixel. In other words, the light emanating from the given pixel is shifted by sub-pixel amounts.

As an example, the liquid-crystal structure may shift light emanating from the given pixel of the image renderer to 3 positions P1, P2, and P3 that lie 10 micrometres, 12 micrometres, and 13 micrometres away, respectively, from an initial position of the given pixel. This shifting may be performed in the sequence P0→P1→P2→P3, wherein P0 is the initial position of the light when no shifting occurs. Thus the light emanating from the given pixel is shown at the positions P0, P1, P2 and P3 in the sequential and repeated manner.

It will be appreciated that the "initial position" of the given pixel is a position attained by the given pixel on an imaginary plane when the liquid-crystal structure is not addressed (namely, is turned off). In such a case, the light emanating from the given pixel undergoes simple refraction as it passes through the liquid-crystal structure. Resultantly, the light is incident at the initial position on the imaginary plane.

Optionally, the liquid-crystal structure comprises a plurality of layers of a liquid-crystal substance that are individually and selectively addressable, wherein a given layer is to be selectively addressed to direct light received thereat from the given pixel or from a previous layer towards a given direction. Herein, the term "liquid-crystal substance" refers to the aforesaid liquid-crystal medium. The plurality of layers of the liquid-crystal substance allow for directing light received thereat towards multiple directions. The plurality of layers are addressable (by the control circuit) to shift the light emanating from the image renderer in the sequential and repeated manner.

As an example, the plurality of layers of the liquid-crystal substance may be addressable to shift the light emanating from the given pixel of the image renderer to four positions in a clockwise and repeated manner. One such manner of shifting the light emanating from the given pixel of the image renderer has been illustrated in conjunction with FIG. 5B, as described below.

Optionally, the plurality of layers comprise a first layer and a second layer, wherein the first layer, when addressed, directs light received thereat from the given pixel towards a first direction, and wherein the second layer, when addressed, directs light received thereat from the first layer in a second direction, the second direction being orthogonal to the first direction. Optionally, in this regard, the first and second layers are collectively addressable to direct the light to a plurality of positions that lie on an imaginary plane extending across the first and second directions.

As an example, the first and second layers may shift the light emanating from the given pixel to three positions on an imaginary plane extending across the first and second directions. As a result, the given pixel attains a total of four positions on the imaginary plane (notably, one initial position and three shifted positions). One such exemplary liquid-crystal structure has been illustrated in conjunction with FIG. 4, as described below.

Optionally, the display apparatus further comprises a collimator arranged between the image renderer and the liquid-crystal structure. The collimator focuses light emanating from the pixels of the image renderer as the light travels from the image renderer towards the liquid-crystal structure. In particular, the collimator minimizes spreading of light emanating from each pixel of the image renderer, thereby minimizing blending (or overlap) of light emanating from one pixel of the image renderer with light emanating from another pixel of the image renderer. Moreover, the collimator allows for properly blending light from sub-pixels of a given pixel of the image renderer before the light is incident upon the liquid-crystal structure to be shifted by the liquid-crystal structure. Therefore, the collimator performs both differentiating and collimating functions for the light emanating from the pixels of the image renderer.

Optionally, the collimator is implemented as a perforated plate. Alternatively, optionally, the collimator is implemented as a lenticular array. Yet alternatively, optionally, the collimator is implemented as an array of nanotubes, wherein each nanotube of the array collimates light emanating from a single pixel of the image renderer. Still alternatively, optionally, the collimator is implemented as a fiber optic plate.

One exemplary arrangement of the liquid-crystal structure, the collimator, and the image renderer has been illustrated in conjunction with FIG. 3, as described below.

Throughout the present disclosure, the term "processor" refers to hardware, software, firmware or a combination of these. The processor controls overall operation of the display apparatus. In particular, the processor is coupled to and controls operation of the image renderer and the liquid-crystal device. It will be appreciated that the processor is coupled to various components of the display apparatus and optionally, controls operation of at least some of said components.

The sequence of output image frames is rendered via the image renderer. Upon rendering, the sequence of output image frames is visible to the user. Herein, the term "output image frame" refers to an image frame that serves as an output to be rendered on the image renderer. Notably, the sequence of output image frames constitutes the visual scene of the extended-reality environment.

The shift in the light emanating from the given pixel of the image renderer to the plurality of positions causes the resolution of the output image frames to appear higher than the display resolution of the image renderer. Given that the light emanating from the given pixel is shifted from the initial position to X positions in a sequential and repeated manner, projections of X+1 output image frames (that are rendered via the image renderer) would be shown to the user at their corresponding positions (from amongst the X positions and the initial position). The user is unable to discern the shift of the given pixel within the projections of the X+1 output image frames and perceives a unified view having a resolution (commonly referred to as "super resolution") that is higher than the display resolution. In other words, the resolution of the output image frames appears to be enhanced with respect to the display resolution of the image renderer.

Optionally, the at least one processor is configured to process a sequence of input image frames to generate the sequence of output image frames, a given output image frame comprising a first region and a second region, wherein an angular resolution of the first region is higher than an angular resolution of the second region, while a temporal resolution of the second region is higher than a temporal resolution of the first region.

Throughout the present disclosure, the term "input image frame" refers to an image frame that serves as an input for generating a corresponding output image frame. Notably, the sequence of input image frames is not shown to the user, whereas the sequence of output image frames is shown to the user.

Throughout the present disclosure, the term "angular resolution" of a given region of a given image frame refers to a number of pixels per degree (also referred to as points per degree (PPD)) in the given region. Notably, a high angular resolution of the given region is indicative of a high visual detail of the given region.

Optionally, the given output image frame comprises the first region and the second region. The "first region" of a given output image frame refers to a region of the given output image frame having a higher angular resolution and a lower temporal resolution as compared to the "second region" of the given output image frame. Throughout the present disclosure, the term "temporal resolution" of a given region of the given output image frame refers to an apparent frame rate of the given region of the given output image frame.

According to an embodiment, a given input image frame has a uniform angular resolution, whereas a corresponding output image frame has a non-uniform (namely, variable) angular resolution. As the angular resolutions of the first and second regions of the given output image frame are different, the given output image frame has the variable angular resolution. It will be appreciated that the given output image frame having the variable angular resolution is a foveated image frame as the variable angular resolution of the given output image frame emulates foveation properties of the human visual system.

Optionally, a given output image frame having the variable angular resolution is produced in a manner that:
a same pixel value of a given pixel in a first region of the given input image frame is associated with a corresponding pixel in a first region of the corresponding output image frame, and pixel values of pixels in a second region of the given input image frame are down-sampled to obtain a pixel value of a given pixel in a second region of the corresponding output image frame.

Optionally, the sequence of output image frames is rendered in a manner that second regions of the output image frames appear to have a higher frame rate than first regions of the output image frames. Resultantly, no flicker or jerk is noticed by the user in the second regions of the output image frames. Moreover, when the sequence of output image frames is rendered, the user perceives higher visual detail in the first regions of the output image frames as compared to the second regions of the output image frames.

Optionally, the sequence of output image frames is rendered in a manner that:
a same pixel value is rendered for a given pixel in first regions of at least two successive output image frames; and
different pixel values are rendered for a given pixel in second regions of different output image frames.

As a result, an apparent frame rate of the second regions of the output image frames is higher than an apparent frame rate of the first regions of the output image frames.

It will be appreciated that the sequence of input image frames are optionally processed to generate the sequence of output image frames in a manner that the second regions of the input image frames undergo a reduction in angular resolution whilst not undergoing a reduction in temporal resolution, whereas the first regions of the input image frames undergo a reduction in temporal resolution whilst not undergoing a reduction in angular resolution.

According to another embodiment, a given input image frame and its corresponding output image frame have a uniform angular resolution. Optionally, in this regard, the given input image frame and its corresponding output image frame are warped. Optionally, when a given output image frame is warped, the display apparatus further comprises at least one optical element arranged on an optical path of a projection of the given output image frame, wherein the optical element comprises different optical portions having different optical properties with respect to magnification, thereby enabling optical de-warping of the given output image frame. Such optical de-warping of the output image frames produces an image having a spatially-variable angular resolution on an image plane. Herein, the term "image plane" refers to an imaginary plane on which the produced image is visible to the user.

In an embodiment, the at least one optical element is implemented as at least one of: a lens, a mirror, a prism. As an example, the at least one optical element is implemented as a single lens or mirror having a complex shape (for example, an aspheric shape).

It will be appreciated that using the liquid-crystal structure in association with the image renderer, and optionally processing the sequence of input image frames to generate the sequence of output image frames allows for presenting a foveated visual scene to the user. In the display apparatus, the variable angular resolution of the output image frames emulates and approximates human-eye resolution and human-eye foveation properties, without requiring use of expensive high-resolution image renderers and additional optical components. Therefore, costs associated with manufacturing the display apparatus are reduced, and an arrangement of components within the display apparatus is considerably simplified as compared to similar conventional display apparatuses. Additionally, this also allows for manufacturing compact display apparatuses that are more convenient for the user to use. Moreover, with simplification of the arrangement of components, an optical path of the projections of the output image frames from the image renderer to the user's eyes is also simplified. This consequently allows for providing a large field of view to the user of the display apparatus. Overall, due to these advantages, the user's experience of using the display apparatus is excellent as the user experiences immersion and realism within extended-reality environments presented via the display apparatus.

Optionally, when processing the sequence of input image frames, the at least one processor is configured to combine a plurality of pixels in a second region of each input image frame to generate a given pixel in a second region of a corresponding output image frame. Herein, "combining" refers to an image processing operation wherein pixel values of a group of pixels are combined to yield a single resultant pixel value, the single resultant pixel value being associated with a single pixel corresponding to said group of pixels. Therefore, combining operation incorporates visual information associated with the group of pixels into the single pixel. Upon combining the plurality of pixels in the second region of a given input image frame, there are generated a plurality of pixels in the second region of the corresponding output image frame, wherein a given pixel in the second region of the corresponding output image frame is larger in size as compared to a given pixel in the second region of the given input image frame. As a result of the combining operation, angular resolution of the second region of the output image frame is lower than angular resolution of the second region of the corresponding input image frame. An exemplary illustration of how pixels in the second region of the given input image frame are combined to generate a corresponding pixel of the second region of the corresponding output image frame has been illustrated in conjunction with FIG. 5C, as described below.

Optionally, when combining the plurality of pixels in the second region of each input image frame to generate the given pixel in a second region of the corresponding output image frame, the at least one processor is configured to employ at least one of: pixel binning, weighted averaging, non-linear median filtering, minimum-maximum filtering, interpolation, image scaling (namely, image resizing).

As an example, pixel values of the pixels in the second region of each input image frame may be binned in groups of four (namely, quad-groups) to generate corresponding pixels in the second region of the corresponding output image frame. For example, pixel values of 4 pixels that are arranged as a 2*2 grid in a second region of a given input image frame may be averaged to yield a resultant pixel value, the single resultant pixel value being associated with a single pixel (corresponding to the grid of 4 pixels) in a second region of a given output image frame. In simpler words, the 4 pixels in the second region of the given input image frame become one pixel in the second region of the output image frame. In such a case, four different, successive resultant pixel values are rendered for the single pixel during rendering of four successive output image frames. It will be appreciated that in this example, angular resolution of the second region of the given output image frame would be one-fourth the angular resolution of the second region of the given input image frame.

It will be appreciated that the second region of each input image frame is processed to generate the second region of its corresponding output image frame. As a result, an apparent frame rate of the second regions of the output image frames is same as a rate at which the input image frames are obtained. The apparent frame rate of the second regions of the output image frames is high (for example, such as 90 frames per second, 100 frames per second, 120 frames per second, 180 frames per second, 240 frames per second, and the like) and the user is unable to perceive any flicker in these second regions.

It will also be appreciated that when optionally processing the sequence of input image frames, the at least one processor may employ other image processing operations for reducing angular resolution of the second region of each input image frame to generate the second region of the corresponding output image frame. Examples of such other image processing operations include, but are not limited to, a low-pass filtering operation, and image subsampling.

Optionally, when processing the sequence of input image frames, the at least one processor is configured to generate from a first region of each Nth input image frame first regions of N successive output image frames. In other words, every Nth input frame is used to generate the first regions of N successive output image frames. In simpler terms, only first regions of select input image frames among the sequence of input image frames are used to generate first regions of all output image frames, wherein a first region of a select input image frame is used to generate first regions for a plurality of (namely, multiple) output image frames.

Notably, for a given pixel in the first region of a given Nth input image frame, a same pixel value of the given pixel is to be rendered in the N successive output image frames. As a result, an apparent frame rate of the first regions of output image frames reduces to 1/N.

In an example, when N is equal to 4, a first region of each 4th input image frame is used to generate first regions of 4 successive output image frames. In such a case, if the rate at which the input image frames are obtained is 100 frames per second, the apparent frame rate of first regions of output image frames reduces to 25 frames per second.

It will be appreciated that a refresh rate of the image renderer is equal to or more than a rate at which the sequence of output image frames is rendered. For example, when 100 output image frames are rendered per second, the apparent frame rate of second regions of the output image frames would be 100 frames per second. In such an example, when a first region of every 4th input image frame is used to generate first regions of 4 successive output image frames, an apparent frame rate of first regions of the output image frames would be 25 frames per second. Therefore, the refresh rate of the image renderer would be at least 100 Hz.

It will be appreciated that when the sequence of input image frames is processed in the aforesaid manner (notably, when the first region of each Nth input image frame is used to generate the first regions of N successive output image frames), an apparent angular resolution of the first regions of the output image frame is increased by shifting (via the liquid-crystal structure) a given pixel in the first region of each Nth input image frame to N different positions when rendering N successive output image frames. When the user views the N successive output image frames, the user is unable to perceive this shifting in light. Instead, the user perceives an extremely high angular resolution (commonly referred to as super-resolution) of the first regions of the N successive output image frames. In other words, the angular resolution of the first regions of the N successive output image frames appears to be super sampled. In this way, a spatial resolution of the first regions of the output image frames is up-sampled within temporal domain. In other words, there occurs spatial resolution up-conversion by temporal resolution down-sampling. It will be appreciated that when the first regions are generated in such a manner, screen door effect is considerably reduced (as the light from the given pixel is shifted in a manner that the light illuminates (namely, occupies) gaps between the given pixel and its neighbouring pixels).

In this regard, the display apparatus optionally provides variable spatio-temporal resolution. In particular, the angular resolution of the first regions of the output image frames is higher than the angular resolution of the second regions of the output image frames, the angular resolution of the first regions optionally approximating super-resolution. It will be appreciated that super-resolution is provided only in the first regions as foveas of the user's eyes are quite insensitive to flicker. Provision of the super-resolution limits refresh rate of the first regions, which introduces flicker, but the user is unable to perceive the flicker due to the aforesaid property of the foveas. In the second regions, the super-resolution is not provided since remaining portions of the retinas of the user's eyes are quite sensitive to flicker.

Optionally, the sequence of input image frames is processed to generate the sequence of output image frames in a manner that in a given output image frame:
  the first region corresponds to a central region of the given output image frame; and
  the second region surrounds the first region.

In this regard, locations of the first region and the second region in the given output image frame are fixed. The central region of the given output image frame has a higher angular resolution (and consequently, higher visual detail) as compared to its surrounding (namely, peripheral) portion of the given output image frame. It is generally observed that human beings have a tendency of focusing at objects lying in a central portion of a field of view of their eyes, thereby, perceiving more visual detail of said objects as compared to other objects lying in a peripheral portion of the field of view. Moreover, when the human beings wish to focus on objects lying in the peripheral portion of the field of view, the human beings generally turn their heads in a manner that said objects now lie in a central portion of a new field of view. Therefore, when the given output image frame comprises the first region in the central region and the second region in the surrounding region, the given output image frame corresponds to the aforesaid generally observed fixed foveation properties of the human visual system.

Optionally, the display apparatus further comprises means for detecting a gaze direction of a user's eye, wherein the sequence of input image frames is processed, based on the detected gaze direction, to generate the sequence of output image frames. In this regard, locations of the first region and the second region in the given output image frame vary according to the detected gaze direction. Specifically, the locations of the first and second regions of the given output image frame are re-arranged for every output image frame in a manner that the first region is focused onto the foveas of the user's eyes, whereas the second region is focused onto the remaining portions of the retinas of the user's eyes. Therefore, when the sequence of output image frames is generated based on the detected gaze direction, the output image frames correspond to active foveation properties of the human visual system.

Throughout the present disclosure, the term "means for detecting the gaze direction" refers to specialized equipment for detecting and/or following a direction of gaze of the user of the display apparatus, when said user views the sequence of output image frames. Notably, the gaze direction of the user is detected when the display apparatus in operation is worn by the user. Optionally, the means for detecting the gaze direction is implemented by way of contact lenses with sensors, cameras monitoring the position of the pupil of the user's eye, and the like. Such means for detecting the gaze direction are well-known in the art. Beneficially, the means for detecting the gaze direction is arranged in a manner that said means does not cause any obstruction in an optical path of projections of the sequence of output image frames.

Optionally, the at least one processor is configured to:
  determine a region of interest of a given input image frame based on the detected gaze direction;
  identify the region of interest as a first region of the given input image frame; and
  identify a region of the given input image frame that surrounds the region of interest as a second region of the given input image frame.

Throughout the present disclosure, the term "region of interest" refers to a region of the visual scene whereat the gaze of the user is directed (namely, focused) when the user views the visual scene. In other words, the region of interest is a fixation region within the visual scene. When the gaze direction of the user is directed towards the region of interest, the region of interest is focused onto the foveas of the user's eyes, and is resolved to a much higher detail as compared to the remaining region(s) of the visual scene.

It will be appreciated that the region of interest is optionally identified as the first region of the given input image frame, and said first region of the given input image frame is used to generate the first region of a corresponding output image frame. Therefore, the first region of the corresponding output image frame corresponds to the user's gaze. Moreover, the first region of the corresponding output image frame has a relatively high angular resolution. This emulates visual properties of the foveas of the user's eyes.

Likewise, it will be appreciated that the region of the given input image frame that surrounds the region of interest is optionally identified as the second region of the given input image frame, and said second region of the given input image frame is used to generate the second region of a corresponding output image frame. Therefore, the second region of the corresponding output image frame corresponds to a peripheral region of the user's field of view. Moreover, the second region of the corresponding output image frame has a relatively low angular resolution. This emulates visual properties of the remaining portions of the retinas of the user's eyes.

It will be appreciated that there can optionally be intermediate regions between the first region of the given input image frame and the second region of the given input image frame. Correspondingly, there are optionally generated intermediate regions between the first region of the given output image frame and the second region of the given output image frame. Optionally, the given output image frame comprises at least one intermediate region between the first region and the second region, wherein:

a angular resolution of the at least one intermediate region is higher than the angular resolution of the second region, but is lower than the angular resolution of the first region; and a temporal resolution of the at least one intermediate region is lower than the temporal resolution of the second region, but is higher than the temporal resolution of the first region.

Optionally, the at least one processor is configured to determine a region of interest of a given input image frame based on scene information of the given input image frame. Herein, the term "scene information" refers to information pertaining to an extended-reality scene represented in the given input image frame. This extended-reality scene depicts various objects and/or features which generally have specific characteristics associated therewith. Examples of such characteristics include, but are not limited to, visual characteristics, location, material composition, audio characteristics, haptic characteristics, and physical interaction characteristics. Details of such characteristics pertaining to the extended-reality scene constitute the scene information of the given input image frame.

Optionally, the at least one processor is configured to determine a given region of the given input image frame as the region of interest when objects and/or features lying in the given region are associated with characteristics that are most likely to attract the user's attention. In other words, a region of the given input image frame that includes noticeable (namely, eye-catching) objects and/or features is determined to be the region of interest of the given input image frame. It will be appreciated that the objects and/or features in the given input image frame could be real-world objects and/or features and/or virtual objects and/or features. Optionally, when the given input image frame represents an augmented-reality scene or a mixed-reality scene, the at least one processor is configured to extract characteristics of the real-world objects and/or features using at least one of: a computer vision algorithm, an artificial intelligence algorithm.

In an example, the given input image frame may represent a mixed-reality scene of a dark real-world room having a white virtual ghost. In such an example, a region of the given input image frame that corresponds to the white virtual ghost is determined to be the region of interest of the given input image frame. In another example, the given input image frame may represent a director's cut version of a virtual-reality movie. In such a case, a region of the given input image frame that corresponds to an object that is exclusively a part of the director's cut version is determined to be the region of interest of the given input image frame.

The present disclosure also relates to the method as described above. Various embodiments and variants disclosed above, with respect to the aforementioned first aspect, apply mutatis mutandis to the method.

Optionally, the method further comprises processing a sequence of input image frames to generate the sequence of output image frames, a given output image frame comprising a first region and a second region, wherein an angular resolution of the first region is higher than an angular resolution of the second region, while a temporal resolution of the second region is higher than a temporal resolution of the first region.

Optionally, in the method, the step of processing the sequence of input image frames comprises combining a plurality of pixels in a second region of each input image frame to generate a given pixel in a second region of a corresponding output image frame.

Optionally, in the method, the step of processing the sequence of input image frames comprises generating from a first region of each Nth input image frame first regions of N successive output image frames.

Optionally, the method further comprises:
detecting a gaze direction of a user's eye; and
processing the sequence of input image frames, based on the detected gaze direction, to generate the sequence of output image frames.

Optionally, the method further comprises:
determining a region of interest of a given input image frame based on the detected gaze direction;
identifying the region of interest as a first region of the given input image frame; and
identifying a region of the given input image frame that surrounds the region of interest as a second region of the given input image frame.

Optionally, the method further comprises determining a region of interest of a given input image frame based on scene information of the given input image frame.

Optionally, in the method, the liquid-crystal structure comprises a plurality of layers of a liquid-crystal substance that are individually and selectively addressable, wherein the step of electrically controlling the liquid-crystal structure comprises selectively addressing a given layer to direct light received thereat from the given pixel or from a previous layer towards a given direction.

Optionally, in the method, the plurality of layers comprise a first layer and a second layer, wherein the step of electrically controlling the liquid-crystal structure comprises:
addressing the first layer to direct light received thereat from the given pixel towards a first direction; and
addressing the second layer to direct light received thereat from the first layer in a second direction, the second direction being orthogonal to the first direction.

Optionally, the method further comprises employing a collimator to collimate the light emanating from the given pixel.

DETAILED DESCRIPTION OF THE DRAWINGS

Referring to FIG. 1, illustrated is a block diagram of an architecture of a display apparatus 100, in accordance with an embodiment of the present disclosure. The display apparatus 100 comprises an image renderer per eye (depicted as an image renderer 102 for a first eye and an image renderer 104 for a second eye), a liquid-crystal device per eye (depicted as a liquid-crystal device 106 for the first eye and a liquid-crystal device 108 for the second eye), and at least one processor (depicted as a processor 110). The liquid crystal devices 106 and 108 comprise liquid-crystal structures 112 and 114 and control circuits 116 and 118, respectively.

The liquid-crystal structures 112 and 114 are arranged in front of image-rendering surfaces of the image renderers 102 and 104, respectively. The liquid-crystal structures 112 and 114 are to be electrically controlled, via the control circuits 116 and 118, to shift light emanating from a given pixel of the image renderers 102 and 104, respectively, to a plurality of positions in a sequential and repeated manner.

The processor 110 is configured to render a sequence of output image frames via the image renderers 102 and 104, wherein a shift in the light emanating from the given pixel of the image renderers 102 and 104 to the plurality of positions causes a resolution of the output image frames to appear higher than a display resolution of the image renderers 102 and 104.

Figure 2:
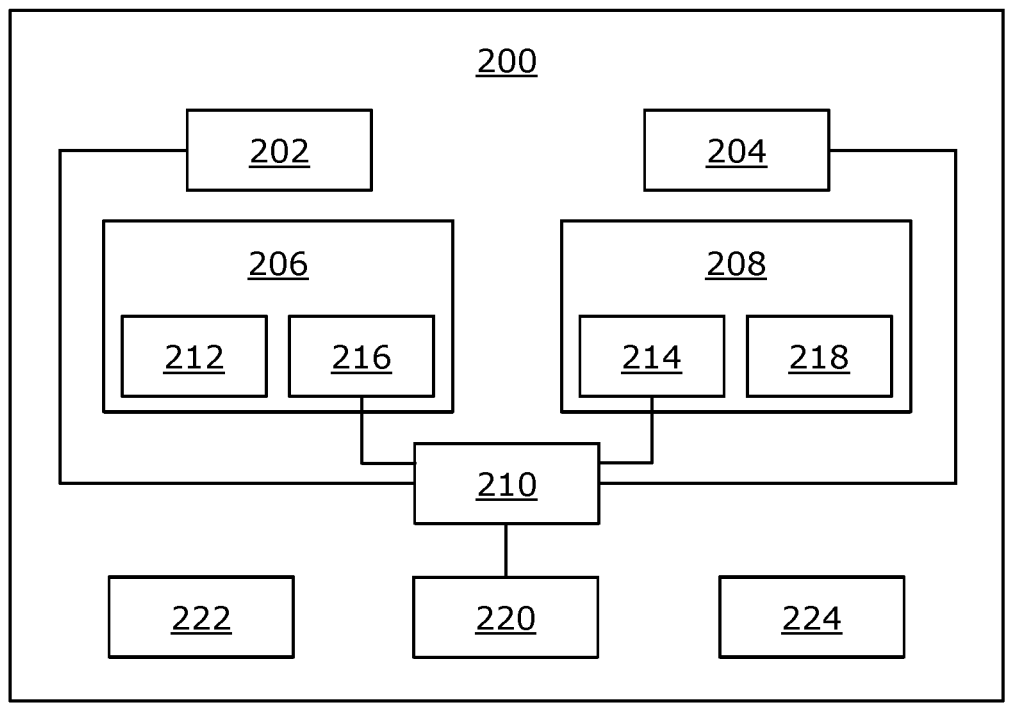

Referring to FIG. 2, illustrated is a block diagram of an architecture of a display apparatus 200, in accordance with another embodiment of the present disclosure. The display apparatus 200 comprises an image renderer per eye (depicted as an image renderer 202 for a first eye and an image renderer 204 for a second eye), a liquid-crystal device per eye (depicted as a liquid-crystal device 206 for the first eye and a liquid-crystal device 208 for the second eye), and at least one processor (depicted as a processor 210). The liquid crystal devices 206 and 208 comprise liquid-crystal structures 212 and 214 and control circuits 216 and 218, respectively.

The display apparatus 200 further comprises means 220 for detecting a gaze direction of a user's eye. The means 220 is coupled to the processor 210. The display apparatus 200 further comprises collimators 222 and 224 arranged between the image renderers 202 and 204 and the liquid-crystal structures 212 and 214, respectively.

It may be understood by a person skilled in the art that the FIGS. 1 and 2 include simplified architectures of different display apparatuses 100 and 200 for sake of clarity, which should not unduly limit the scope of the claims herein. The person skilled in the art will recognize many variations, alternatives, and modifications of embodiments of the present disclosure.

Figure 3:
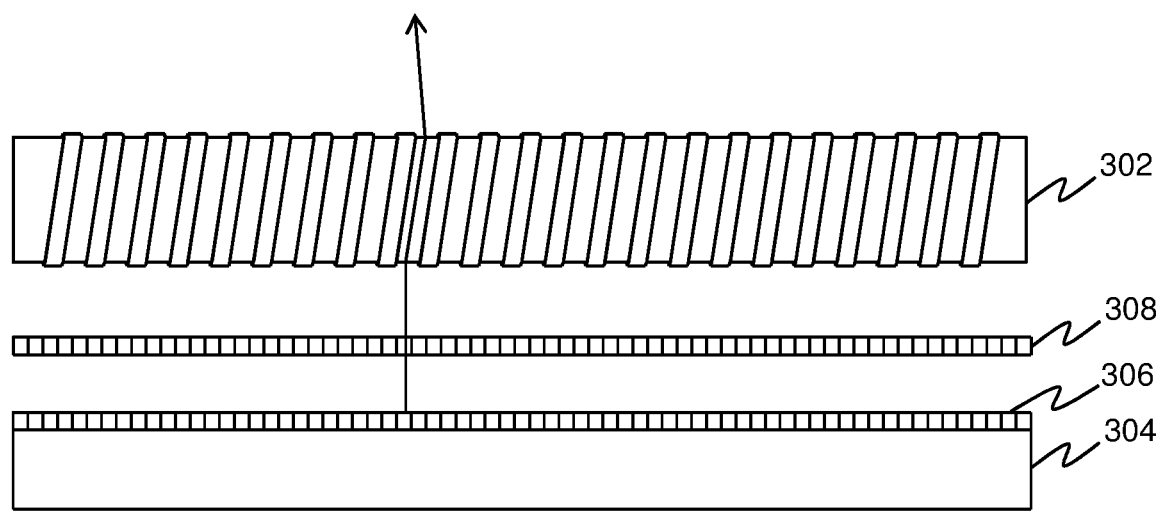
FIG. 3 illustrates an arrangement of a given liquid-crystal structure and a given image renderer, in accordance with an embodiment of the present disclosure.

Referring to FIG. 3, illustrated is an arrangement of a given liquid-crystal structure 302 and a given image renderer 304, in accordance with an embodiment of the present disclosure. As shown, the liquid-crystal structure 302 is arranged in front of an image-rendering surface 306 of the given image renderer 304. Moreover, a collimator 308 is arranged between the given liquid-crystal structure 302 and the given image renderer 304. Notably, light emanating from a given pixel (comprising sub-pixels) of the given image renderer 304 is collimated by the collimator 308 and is directed towards the liquid-crystal structure 302. The liquid-crystal structure 302 is controlled, via a control circuit (not shown) to shift the light to a plurality of positions in a sequential and repeated manner. For sake of simplicity, an exemplary optical path of only a single ray of light is depicted.

Figure 4:
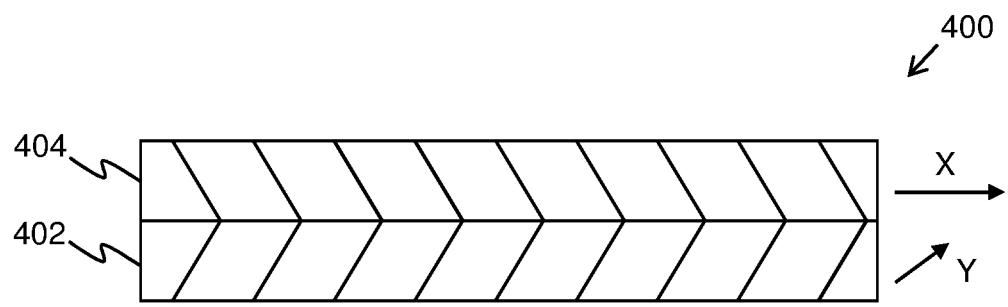
FIG. 4 illustrates an exemplary liquid-crystal structure, in accordance with an embodiment of the present disclosure.
Figure 4:
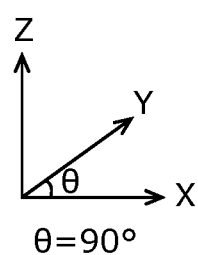

Referring to FIG. 4, illustrated is an exemplary liquid-crystal structure 400, in accordance with an embodiment of the present disclosure. The liquid-crystal structure 400 comprises a plurality of layers (depicted as differently hatched layers) of a liquid-crystal substance that are individually and selectively addressable. A given layer is to be selectively addressed to direct light received thereat from the given pixel or from a previous layer towards a given direction. The plurality of layers comprise a first layer 402 and a second layer 404. The first layer 402, when addressed, directs light received thereat from the given pixel towards a first direction (depicted, for example, as a direction along an exemplary Y-axis). The second layer 404, when addressed, directs light received thereat from the first layer 402 in a second direction (depicted, for example, as a direction along an exemplary X-axis), the second direction being orthogonal to the first direction.

Figure 5A:
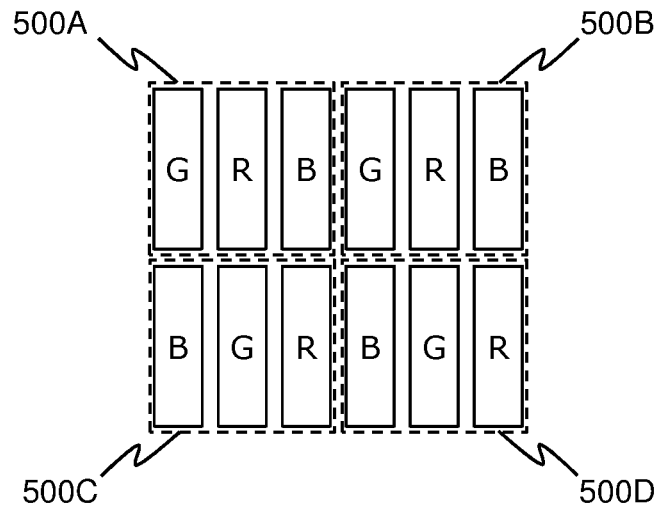
FIG. 5A illustrates sub-pixel structure in an image renderer.
Figure 5B:
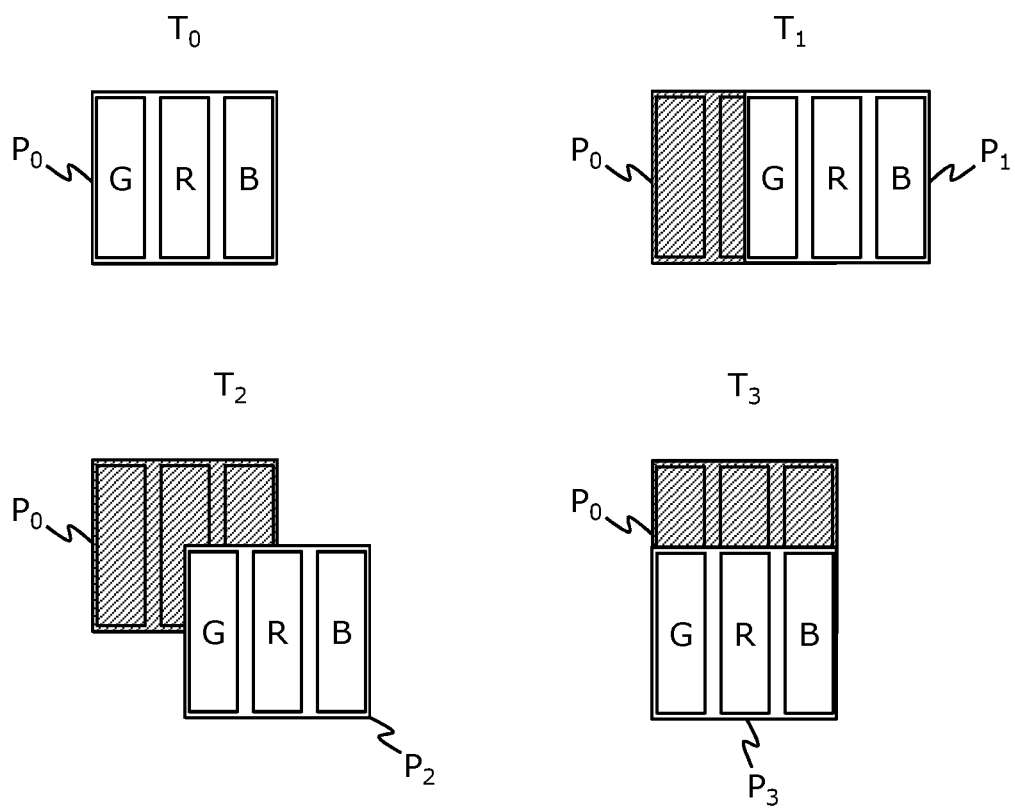
FIG. 5B illustrates how light emanating from a given pixel of the image renderer is shifted to a plurality of positions in a sequential and repeated manner.
Figure 5C:
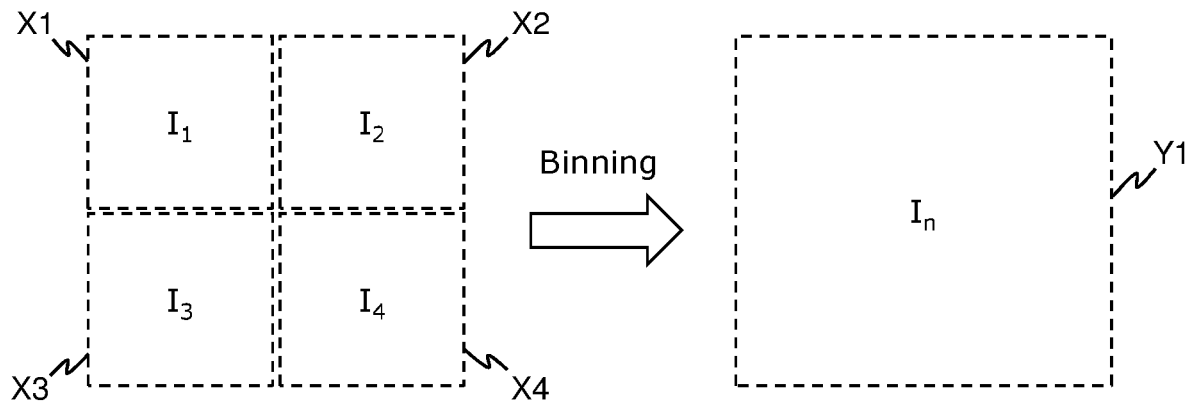
FIG. 5C illustrates how pixels in a second region of a given input image frame are combined to generate a given pixel of a second region of a corresponding output image frame, in accordance with an embodiment of the present disclosure.

Referring to FIGS. 5A, 5B and 5C, FIG. 5A illustrates sub-pixel structure in an image renderer, FIG. 5B illustrates how light emanating from a given pixel of the image renderer is shifted to a plurality of positions in a sequential and repeated manner, and FIG. 5C illustrates how pixels in a second region of a given input image frame are combined to generate a given pixel of a second region of a corresponding output image frame, in accordance with an embodiment of the present disclosure.

In FIG. 5A, four pixels 500A, 500B, 500C, and 500D of the image renderer are shown to be arranged as a 2*2 grid. Each of the four pixels 500A, 500B, 500C, and 500D includes 3 sub-pixels (notably, a red sub-pixel depicted as 'R', a green sub-pixel depicted as 'G', and a blue sub-pixel depicted as 'B').

In FIG. 5B, there is shown how light emanating from a given pixel (for example, such as the pixel 500A) of the image renderer is shifted to a plurality of positions in a sequential and repeated manner. Time $T_0$ indicates a time instant at which a liquid-crystal structure (not shown) is not addressed (namely, is turned off). At the time $T_0$, the light emanating from the given pixel undergoes simple refraction as it passes through the liquid-crystal structure. As a result, the given pixel attains an initial position $P_0$. Thereafter, at times $T_1$, $T_2$, and $T_3$, the liquid-crystal structure is addressed to direct the light emanating from the given pixel to three positions. As shown, at the time $T_1$, the light emanating from the given pixel is shifted rightwards (relative to the initial position $P_0$) to a position $P_1$; at the time $T_2$, the light emanating from the given pixel is shifted downwards (relative to the position $P_1$) to a position P2; and at the time $T_3$, the light emanating from the given pixel is shifted leftwards (relative to the position $P_2$) to a position $P_3$.

In FIG. 5C, there are shown four pixels X1, X2, X3 and X4 in a second region of a given input image frame having intensities $I_1$, $I_2$, $I_3$ and $I_4$, respectively. The four pixels X1-X4 are combined to generate a given pixel Yi of a second region of a corresponding output image frame. An intensity $I_n$ of the given pixel Yi is equal to, for example, an average of intensities $I_1$-$I_4$ of the pixels X1-X4.

Figure 6:
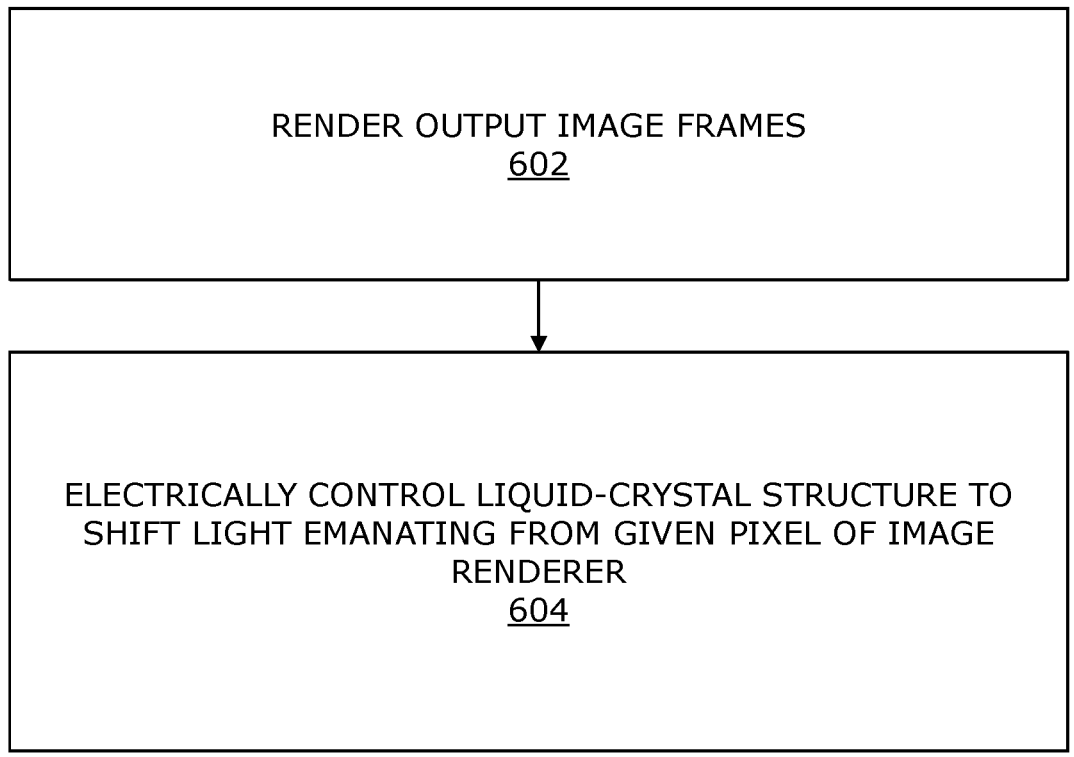
FIG. 6 illustrates steps of a method of displaying via a display apparatus, in accordance with an embodiment of the present disclosure.

Referring to FIG. 6, illustrated are steps of a method of displaying via a display apparatus, in accordance with an embodiment of the present disclosure. The display apparatus comprises an image renderer per eye and a liquid-crystal device comprising a liquid-crystal structure and a control circuit, wherein the liquid-crystal structure is arranged in front of an image-rendering surface of the image renderer. At step 602, a sequence of output image frames is rendered via the image renderer. At step 604, the liquid-crystal structure is electrically controlled, via the control circuit, to shift light emanating from a given pixel of the image renderer to a plurality of positions in a sequential and repeated manner. A shift in the light emanating from the given pixel of the image renderer to the plurality of positions causes a resolution of the output image frames to appear higher than a display resolution of the image renderer.

The steps 602 and 604 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present.

Reference to the singular is also to be construed to relate to the plural.

What is claimed is:

1. A display apparatus comprising:
   an image renderer per eye;
   a liquid-crystal device comprising a liquid-crystal structure and a control circuit, wherein the liquid-crystal structure is arranged in front of an image-rendering surface of the image renderer, wherein the liquid-crystal structure is to be electrically controlled, via the control circuit, to shift light emanating from a given pixel of the image renderer to a plurality of positions in a sequential and repeated manner; and
   at least one processor configured to render a sequence of output image frames via the image renderer, wherein a shift in the light emanating from the given pixel of the image renderer to the plurality of positions causes a resolution of the output image frames to appear higher than a display resolution of the image renderer,
   wherein the at least one processor is configured to process a sequence of input image frames to generate the sequence of output image frames, a given output image frame comprising a first region and a second region, wherein an angular resolution of the first region is higher than an angular resolution of the second region, while a temporal resolution of the second region is higher than a temporal resolution of the first region;
   the display further comprising means for detecting a gaze direction of a user's eye, wherein the sequence of input image frames is processed, based on the detected gaze direction, to generate the sequence of output image frames,
   wherein the at least one processor is configured to:
   determine a region of interest of a given input image frame based on the detected gaze direction;
   identify the region of interest as a first region of the given input image frame; and
   identify a region of the given input image frame that surrounds the region of interest as a second region of the given input image frame.

2. The display apparatus of claim 1, wherein, when processing the sequence of input image frames, the at least one processor is configured to combine a plurality of pixels in a second region of each input image frame to generate a given pixel in a second region of a corresponding output image frame.

3. The display apparatus of claim 1, wherein, when processing the sequence of input image frames, the at least one processor is configured to generate from a first region of each Nth input image frame first regions of N successive output image frames.

4. The display apparatus of claim 1, wherein the at least one processor is configured to determine a region of interest of a given input image frame based on scene information of the given input image frame.

5. The display apparatus of claim 1, wherein the liquid-crystal structure comprises a plurality of layers of a liquid-crystal substance that are individually and selectively addressable, wherein a given layer is to be selectively addressed to direct light received thereat from the given pixel or from a previous layer towards a given direction.

6. The display apparatus of claim 5, wherein the plurality of layers comprise a first layer and a second layer, wherein the first layer, when addressed, directs light received thereat from the given pixel towards a first direction, and wherein the second layer, when addressed, directs light received thereat from the first layer in a second direction, the second direction being orthogonal to the first direction.

7. The display apparatus of claim 1, further comprising a collimator arranged between the image renderer and the liquid-crystal structure.

8. A method of displaying via a display apparatus, the display apparatus comprising an image renderer per eye and a liquid-crystal device comprising a liquid-crystal structure and a control circuit, wherein the liquid-crystal structure is arranged in front of an image-rendering surface of the image renderer, the method comprising:
  rendering a sequence of output image frames via the image renderer; and
  electrically controlling, via the control circuit, the liquid-crystal structure to shift light emanating from a given pixel of the image renderer to a plurality of positions in a sequential and repeated manner, wherein a shift in the light emanating from the given pixel of the image renderer to the plurality of positions causes a resolution of the output image frames to appear higher than a display resolution of the image renderer;
  processing a sequence of input image frames to generate the sequence of output image frames, a given output image frame comprising a first region and a second region, wherein an angular resolution of the first region is higher than an angular resolution of the second region, while a temporal resolution of the second region is higher than a temporal resolution of the first region;
  detecting a gaze direction of a user's eye;
  processing the sequence of input image frames, based on the detected gaze direction, to generate the sequence of output image frames;
  determining a region of interest of a given input image frame based on the detected gaze direction;
  identifying the region of interest as a first region of the given input image frame; and
  identifying a region of the given input image frame that surrounds the region of interest as a second region of the given input image frame.

9. The method of claim 8, wherein the step of processing the sequence of input image frames comprises combining a plurality of pixels in a second region of each input image frame to generate a given pixel in a second region of a corresponding output image frame.

10. The method of claim 8, wherein the step of processing the sequence of input image frames comprises generating from a first region of each Nth input image frame first regions of N successive output image frames.

11. The method of claim 8, further comprising determining a region of interest of a given input image frame based on scene information of the given input image frame.

12. The method of claim 8, wherein the liquid-crystal structure comprises a plurality of layers of a liquid-crystal substance that are individually and selectively addressable, wherein the step of electrically controlling the liquid-crystal structure comprises selectively addressing a given layer to direct light received thereat from the given pixel or from a previous layer towards a given direction.

13. The method of claim 12, wherein the plurality of layers comprise a first layer and a second layer, wherein the step of electrically controlling the liquid-crystal structure comprises:
  addressing the first layer to direct light received thereat from the given pixel towards a first direction; and
  addressing the second layer to direct light received thereat from the first layer in a second direction, the second direction being orthogonal to the first direction.

14. The method of claim 8, further comprising employing a collimator to collimate the light emanating from the given pixel.

* * * * *